United States Patent
Rowles

(10) Patent No.: US 10,643,233 B2
(45) Date of Patent: *May 5, 2020

(54) DISMISS AND FOLLOW UP ADVERTISING

(71) Applicant: Rowles Holdings, LLC, Pasadena, CA (US)

(72) Inventor: Noah Tilman Rowles, Pasadena, CA (US)

(73) Assignee: Rowles Holdings, LLC, Pasadena, CA (US)

( * ) Notice: Subject to any disclaimer, the term of this patent is extended or adjusted under 35 U.S.C. 154(b) by 406 days.

This patent is subject to a terminal disclaimer.

(21) Appl. No.: 15/046,958

(22) Filed: Feb. 18, 2016

(65) Prior Publication Data

US 2016/0162933 A1 Jun. 9, 2016

Related U.S. Application Data

(63) Continuation of application No. 14/566,593, filed on Dec. 10, 2014, now Pat. No. 9,301,022.

(60) Provisional application No. 61/914,297, filed on Dec. 10, 2013.

(51) Int. Cl.
| | |
|---|---|
| *H04N 7/025* | (2006.01) |
| *H04N 7/10* | (2006.01) |
| *G06Q 30/02* | (2012.01) |
| *H04N 21/81* | (2011.01) |
| *H04N 21/414* | (2011.01) |
| *H04N 21/4722* | (2011.01) |
| *H04N 21/435* | (2011.01) |

(52) U.S. Cl.
CPC ... *G06Q 30/0246* (2013.01); *H04N 21/41407* (2013.01); *H04N 21/4722* (2013.01); *H04N 21/812* (2013.01); *H04N 21/435* (2013.01)

(58) Field of Classification Search
USPC .............................................. 725/32, 88–89
See application file for complete search history.

(56) References Cited

U.S. PATENT DOCUMENTS

| | | | | |
|---|---|---|---|---|
| 9,204,205 | B1* | 12/2015 | Pasula | H04N 21/812 |
| 2002/0016965 | A1* | 2/2002 | Tomsen | G06Q 10/10 |
| | | | | 725/42 |
| 2004/0133909 | A1* | 7/2004 | Ma | G06Q 30/0207 |
| | | | | 725/34 |
| 2005/0149880 | A1* | 7/2005 | Postrel | G06F 3/0482 |
| | | | | 715/808 |
| 2010/0061709 | A1* | 3/2010 | Agnihotri | H04N 5/445 |
| | | | | 386/241 |
| 2011/0093320 | A1* | 4/2011 | Blake | G06Q 30/02 |
| | | | | 705/14.16 |
| 2011/0153426 | A1* | 6/2011 | Reddy | G06Q 30/02 |
| | | | | 705/14.58 |
| 2012/0054020 | A1* | 3/2012 | Jacobs | G06Q 30/0269 |
| | | | | 705/14.42 |

* cited by examiner

*Primary Examiner* — Mulugeta Mengesha
(74) *Attorney, Agent, or Firm* — Van Pelt, Yi & James LLP

(57) ABSTRACT

Techniques to allow advertising or other secondary content to be dismissed for later follow up are disclosed. In various embodiments, a user input associated with dismissing a displayed content for later follow up is received. Display of the content item discontinued and a follow up record is stored based at least in part on the indication. The follow up record is used to provide to a user with which the user input is associated a follow up content associated with the dismissed content.

19 Claims, 7 Drawing Sheets

DISMISS AND FOLLOW UP ADVERTISING

CROSS REFERENCE TO OTHER APPLICATIONS

This application is a continuation of co-pending U.S. patent application Ser. No. 14/566,593, entitled DISMISS AND FOLLOW UP ADVERTISING, filed Dec. 10, 2014, which claims priority to U.S. Provisional Patent Application No. 61/914,297, entitled DISMISS AND FOLLOW UP ADVERTISING, filed Dec. 10, 2013, both of which are incorporated herein by reference for all purposes.

BACKGROUND OF THE INVENTION

Users of modern communication devices and media are bombarded with information, including without limitation advertising content. Such content may be displayed in banners or other regions of a display area, as suggested "posts" or other native format content in a social media stream or feed, in pop-ups or other display areas that may obscure or detract from non-advertising content with which the user is attempting to interact.

Typically, such advertising content may be ignored or dismissed if the user has no interest or is too busy to engage with or otherwise use the content. If the user is interested in the advertising content, typically the user must engage with and interact with the content while it remains displayed, which typically requires the user to interrupt the user's use or other interaction with non-advertising content and/or functionality.

BRIEF DESCRIPTION OF THE DRAWINGS

Various embodiments of the invention are disclosed in the following detailed description and the accompanying drawings.

DETAILED DESCRIPTION

Figure 1:
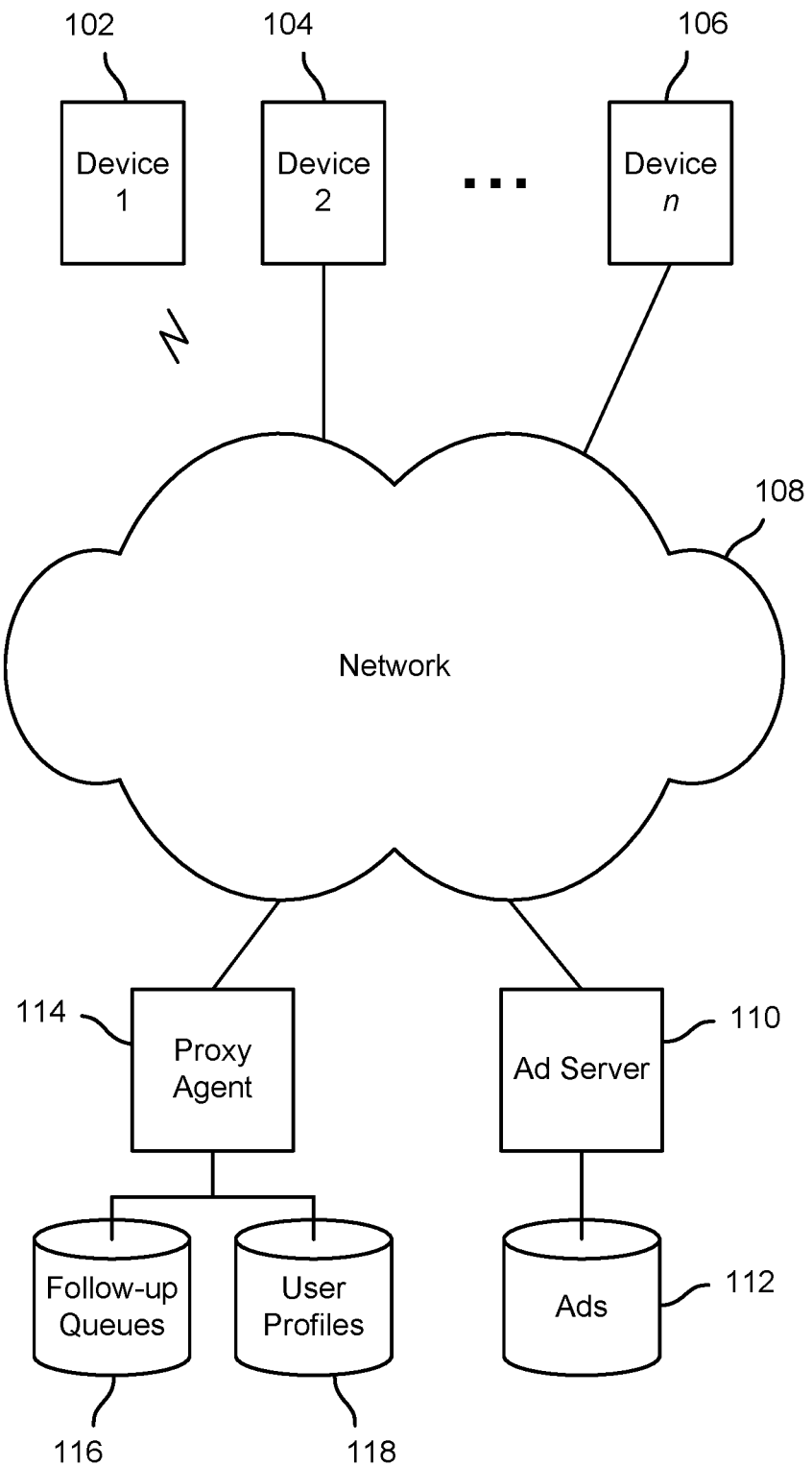
FIG. 1 is a block diagram illustrating an embodiment of a system to allow displayed content to be dismissed for follow up later.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A "dismiss and follow up" model, and systems, methods, and computer program products to implement such a model, are disclosed. In various embodiments, a user control or other interface is provided, in connection with display of an advertisement, to enable the user to dismiss the ad while providing a way for the user to follow up and engage (further) with the ad and/or associated content later. In various embodiments, a prescribed user gesture, for example, may result in the ad being dismissed, but with a follow up communication or other further opportunity to engage with the ad, its sponsor, or an associated third party being provided later. In various embodiments, the follow up opportunity may be provided in a manner indicated and/or controlled by the user.

In various embodiments, a dismiss and follow up model may be implemented at least in part as follows:
1. An advertisement is presented.
2. If user wishes to respond to the ad and receive related information a preferred format, the user interacts with the ad or its delivery host in a specific way (e.g. clicking/tapping an indicated edge or corner, swiping in a certain direction, etc.).
3. If a user invokes this function, the ad may disappear or otherwise reflect the user's follow up request as the following sequence occurs:
   a. A third party advertiser "proxy agent" that the user is currently logged into is contacted with the request. Examples could be Google, Facebook, Twitter, Verizon, AT&T, a cable or satellite company, television network, etc.
   b. The proxy agent relays the follow up request to the advertiser (or advertiser's agent), and includes information such as the specific advertisement being responded to as well as parameters about the requesting user's preferred communication format.
   c. The advertiser provides a response (such as appropriate follow up information or materials in a prescribed format) to the proxy agent. The proxy agent delivers the response to the user in his/her preferred format (examples: email, facebook post, tweet, text message, telephone call, physical mail, etc.) User receives the response and reviews any follow up materials at his or her convenience at a later date and may respond directly to advertiser if desired In various embodiments, techniques disclosed herein may be used in the context of one or more of the following types of device and/or media:

1) Standard personal computers (Windows, Mac, desktops, laptops, etc.)
2) Smartphones, tablets
3) On-demand television/streaming media
4) Radio/streaming music or content
5) Telephone marketing FIG. 1 is a block diagram illustrating an embodiment of a system to allow displayed content to be dismissed for follow up later. In the example shown, a plurality of devices 1 to n, represented in FIG. 1 by devices 102, 104, and 106, connect via a network 108 to content provider services, not shown in FIG. 1. Examples of content provider services included, without limitation, search results and other web content; publisher content; mobile app content; streaming video; and application content accessed using a browser, client application, etc. In various embodiments, ad servers such as ad server 110 may be used to provide ads to be served to devices such as 102, 104, and 106 ads, such as ads stored in an associated ad content store 112, to be displayed in advertising content display locations within pages or other displays provided to users of devices 102, 104, and 106 in connection with their consumption of other content using such devices. Examples include without limitation banner ads or other ads displayed in designated locations within a display of other, e.g., primary, content; pop-ups or other ads displayed in windows, tabs, frames, or other display areas that are distinct from but displayed in connection with the display of other content; ads inserted into breaks in other content, such as video content streamed to a networked television, computer, or other display device; and ads displayed in a designated part of a display of search results or other content.

In various embodiments, a proxy agent system 114 is used as an intermediary to provide ads for display on devices such as devices 102, 104, and 106. For example, as users of devices such as devices 102, 104, and 106 access primary content, proxy agent system 114 may receive an indication as opportunities to display ads arise. Proxy agent system 114 may obtained ads from ad servers such as ad server 110, and provide such ads for display on devices such as devices 102, 104, and 106. In some embodiments, proxy agent system 114 may be configured to insert into and/or otherwise provide in connection with ad content additional images and/or code to be displayed and/or otherwise used at the destination device to enable a user of the device to dismiss the ad for later follow up, as disclosed herein. For example, in some embodiments proxy agent system 114 may provide a transparent layer that includes code that will respond to performance by a user of a dismiss and follow up touch screen gesture by providing dismiss and follow up processing as disclosed herein. In some embodiments, the layer may be transparent with the exception of a widget or other visibly displayed control that will be displayed in a manner and/or region of the advertising display area so as to interfere only minimally or not at all in the display of the advertising content.

In some embodiments, ads may be served to user devices, such as devices 102, 104, and 106, directly from ad servers such as ad server 110, but will be displayed at such devices in a manner that provides a mechanism for the user to dismiss the advertising content for follow up later.

In various embodiments, proxy agent system 114 is configured to support dismissal of advertising (or other) content for follow up later. Upon receiving an indication that a specific user (device) has received an input to dismiss an ad for later follow up, proxy agent system 114 adds to a follow up queue associated with the user (device) an entry for the dismissed ad. The follow up queue for the user (device) may be included in a follow-up queue data store 116 comprising for each of a plurality of users (devices) a corresponding queue of ads (or other content) that the user has dismissed previously for follow up later. In various embodiments, the timing, nature, and manner of follow up may be determined at least in part based on user profile (e.g., preference) data stored in a user profile database 118. For example, and without limitation, a user may indicate dismiss and follow up preferences, using a web-based or other dismiss and follow up user settings interface. Preferences indicated by a user may be stored in a corresponding user profile in user profile database 118.

In various embodiments, user preferences and/or proclivities may be inferred from tracked user behavior, e.g., tracked user engagement with ads (e.g., which ads provided to the user were ignored, engaged with immediately by the user, and/or dismissed for later follow up by the user) and/or tracked user further engagement with ads dismissed previously by the user for later follow up. In various embodiments, tracked behavior and/or profile attributes derived from such tracked behavior may be store in the user profile database 118.

In various embodiments, interposing proxy agent system 114 between the users of devices such as devices 102, 104, and 106, on the one hand, and ad servers such as ad server 110, on the other, provides the ability for the user to dismiss and ad for later follow up with the knowledge and assurance that the advertiser will not immediately and/or directly receive any personal identifying information about the user. Instead, the follow up content may be viewed by the user at the user's leisure, via the proxy agent system 114, and only upon providing an indication that the user desires to engage further and/or directly with the advertiser regarding the ad content will such information be provided to the advertiser.

In various embodiments, advertisers may provide or otherwise make accessible to proxy agent system 114 further and/or different content than the original ad content. For example, advertisers may provide more detailed and/or more rich (e.g., multi-media, etc.) content to be displayed to users who have dismissed a displayed ad for later follow up. Such further content may be interactive and may provide inducements, opportunities, and mechanisms for the user to provide and/or request further information. In various embodiments, user interactions with content provided to the user by proxy agent system 114 during the course of follow up are tracked. User information may be gathered and/or obtained from user profile data to be provided to an advertiser for further follow up, e.g., by a human sales representative, online interactions, etc.

Figure 2:
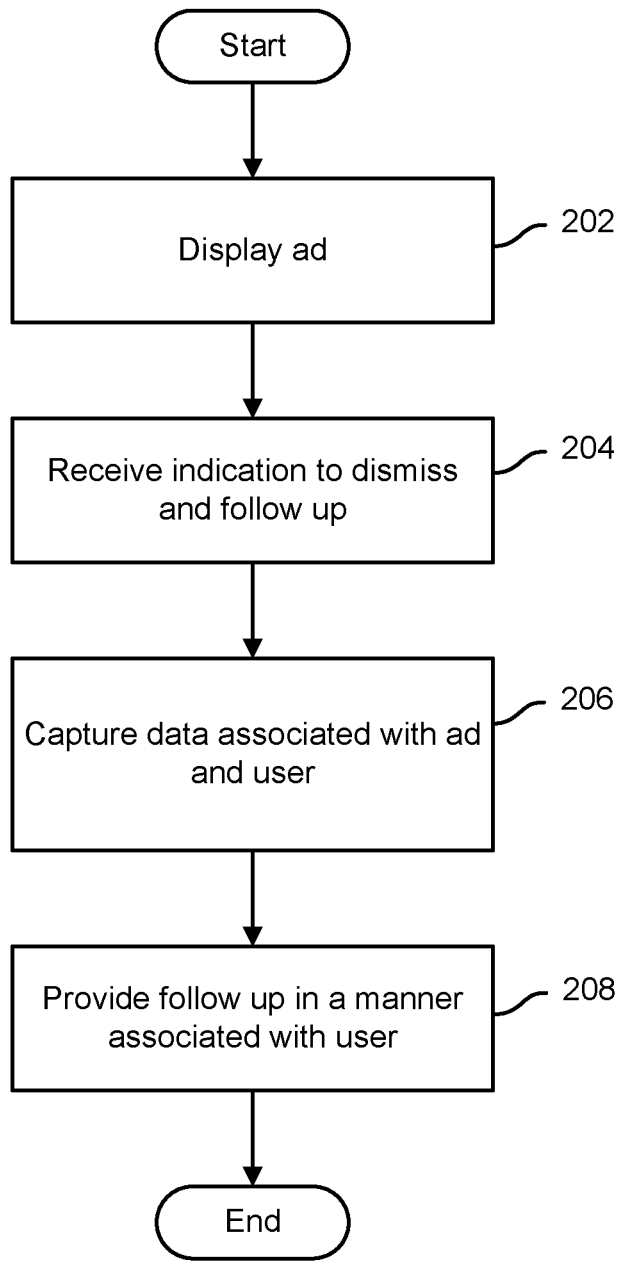
FIG. 2 is a flow chart illustrating an embodiment of a process to allow displayed content to be dismissed for follow up later.

FIG. 2 is a flow chart illustrating an embodiment of a process to allow displayed content to be dismissed for follow up later. In the example shown, an ad is displayed (202). An indication, e.g., a user input, is received that the user desires to dismiss the ad and follow up later (204). Data associated with the ad (e.g., ad content, unique content id, etc.) and user (e.g., device id, user id) are captured and used to store a follow up record, such as by adding data associated with the ad to a follow up queue associated with the user and/or device (206). Follow up is provided in a manner associated with the user (208). For example, in various embodiments the user may specify how and when the user is to be informed/reminded of the follow up (e.g., add to a queue the user must access to follow up; email, text message, or other communication to the user; etc.). In various embodiments, a proxy agent such as proxy agent system 114 of FIG. 1 implements all or part of the process of FIG. 2.

Figure 3:
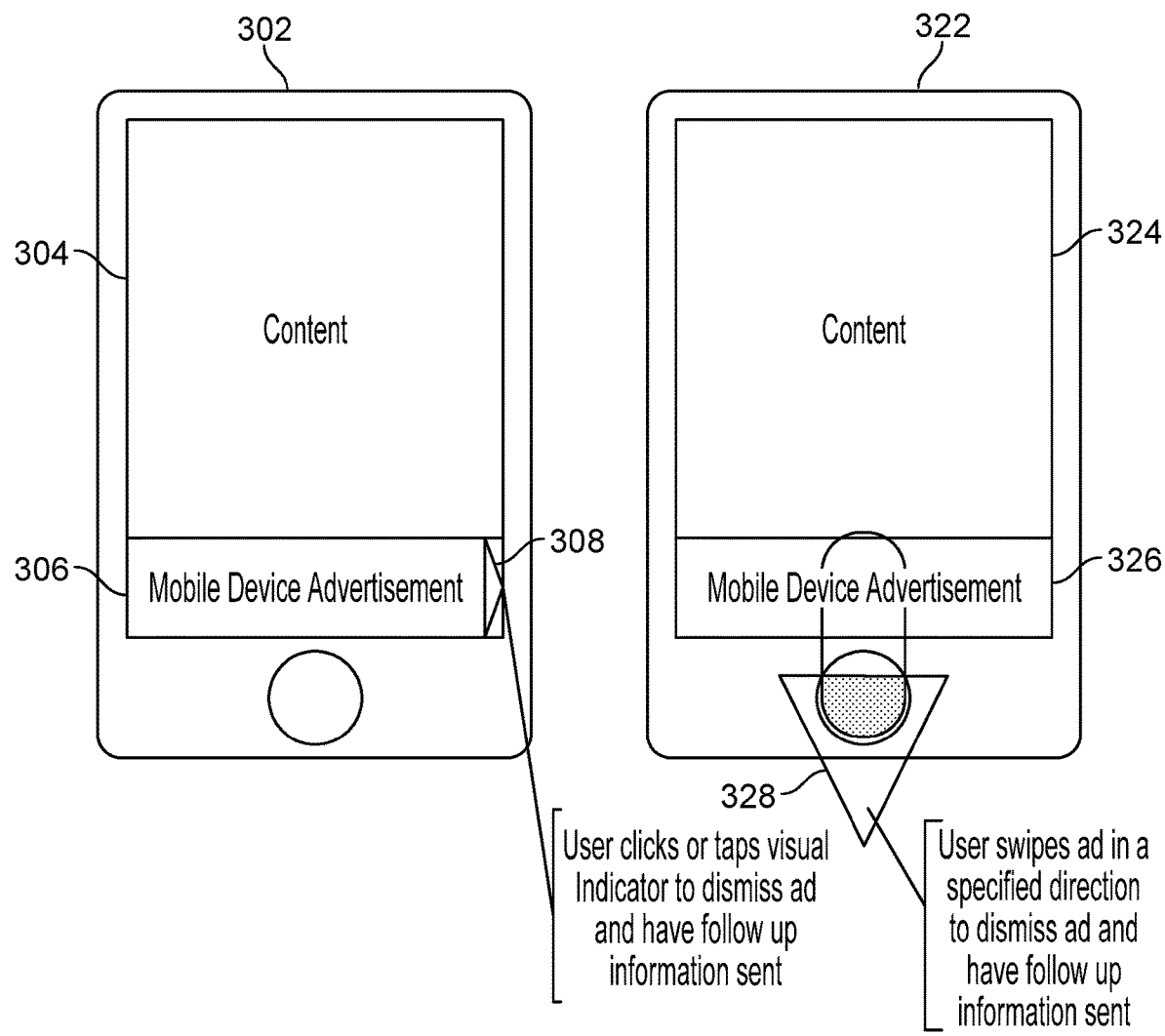
FIG. 3 is a block diagram illustrating an embodiment of a mobile device user interface to dismiss displayed content for follow up later.

FIG. 3 is a block diagram illustrating an embodiment of a mobile device user interface to dismiss displayed content for follow up later. In various embodiments, a visual control or other indicator may be selected by a user, or a specific user gesture may be used, to dismiss and ad and receive follow up later. In the example shown on the left side in FIG. 3, mobile device 302 includes a touch-sensitive display device on which a primary content is displayed in an upper portion 304 and a mobile device advertisement is displayed in an ad display area 306. The ad in this example includes a user selectable dismiss and follow up control 308. Upon selection of the control 308, dismiss and follow up processing is performed with respect to the ad displayed in ad display area 306. In the example on the right side in FIG. 3, mobile device 322 includes a touch sensitive display device in which a primary content is displayed in an upper display area 324 and a mobile device advertisement is displayed in an ad display area 326. A user dismiss and follow up touchscreen gesture 328, in this example a swipe downward from the ad displayed in area 326, results in the ad being dismissed (no longer displayed) and saved for follow up later.

Figure 4:
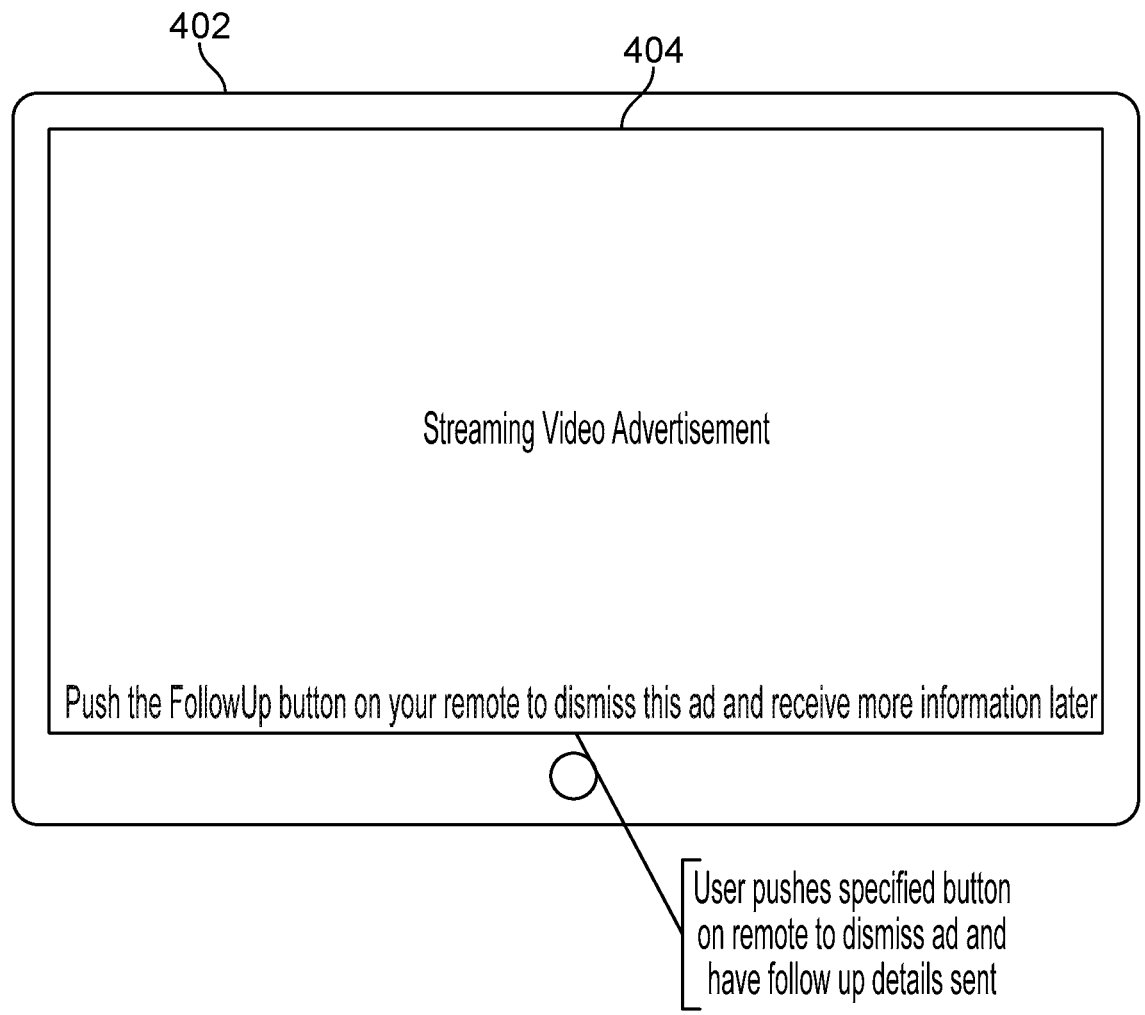
FIG. 4 is a block diagram illustrating an embodiment of a streaming video system and user interface to dismiss displayed content for follow up later.

FIG. 4 is a block diagram illustrating an embodiment of a streaming video system and user interface to dismiss displayed content for follow up later. In various embodiments, a user may be invited and/or enabled to select a specified control, such as a specific button on the user's remote control or other device, to dismiss an ad and receive follow up later and/or via a separate communication and/or medium. In the example shown, a streaming video system 402 includes a display device 404 on which a streaming video advertisement is displayed. The user is invited by text displayed at the bottom of display device 404 to select a dismiss and follow up control on the user's remote to dismiss the ad and receive follow up information later, e.g., via a different medium and/or at a more convenient time. In some embodiments, the dismiss and follow up control enables a viewer to resume receiving the primary streaming video content immediately, without having to wait for the ad to be displayed, in exchange for agreeing to receive follow up information later and/or via another medium.

Figure 5:
FIG. 5 is a block diagram illustrating an embodiment of a computer system and browser interface to dismiss displayed content for follow up later.

FIG. 5 is a block diagram illustrating an embodiment of a computer system and browser interface to dismiss displayed content for follow up later. In various embodiments, ad or other secondary content displayed via a web browser, such as search engine search results, may include a user-selectable link which, if selected by the user, results in a follow up being sent to the user, e.g., in a user-specified and/or configurable way, about the associated advertisement or other content. In the example shown, computer system 502 includes a display device 504 on which a web browser is being used to display search engine results. The search engine results page includes a set of advertisements 506, each of which includes an associated user-selectable hyperlink labeled "dismiss and follow up". Selection of a link results in an HTTP call to an associated URL, which in turn results in dismiss and follow up processing being performed as disclosed herein.

Figure 6:
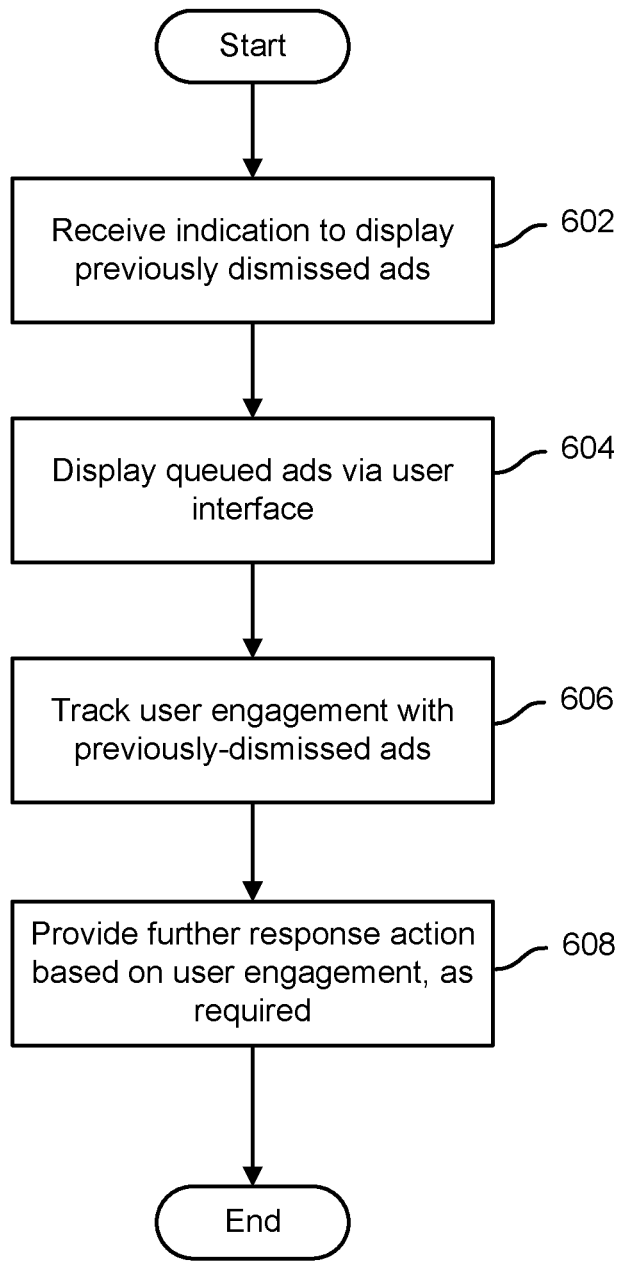
FIG. 6 is a flow chart illustrating an embodiment of a process to provide access to content dismissed previously for follow up later.

FIG. 6 is a flow chart illustrating an embodiment of a process to provide access to content dismissed previously for follow up later. In the example shown, an indication is received to display content associated with previously dismissed ads (602). A queue of ads previously dismissed by the user is displayed (604). For example, advertiser and/or product names may be listed, or graphical representations of the ad content or portions thereof. User further engagement with previously dismissed ads is tracked (606). For example, user actions such as deleting an ad from the queue without viewing further information; viewing an ad for a tracked amount of time; selecting or mousing over or performing other actions that may be associated with a level of interest in portions of an ad; interacting with interactive ad or follow up content; filling out a form or survey; selecting a control to get more information; clicking through to an advertiser's site, etc. may be tracked. User interaction with related content, such as other websites or sources of information on the subject, such as a product or class of product, may be tracked. Further responsive actions may be taken based on the observed user interaction with the follow up content (608). For example, a sales "lead" record may be generated and sent to the advertiser. Such a record may include tracking information regarding the user's interaction with the ad and/or related content, and in some embodiments may include user profile data. For example, in some embodiments a user may be invited to select a control to be contacted by a sales representative. Contact information, including the user's preferred manner of being contacted, may be provided to the advertiser.

Figure 7:
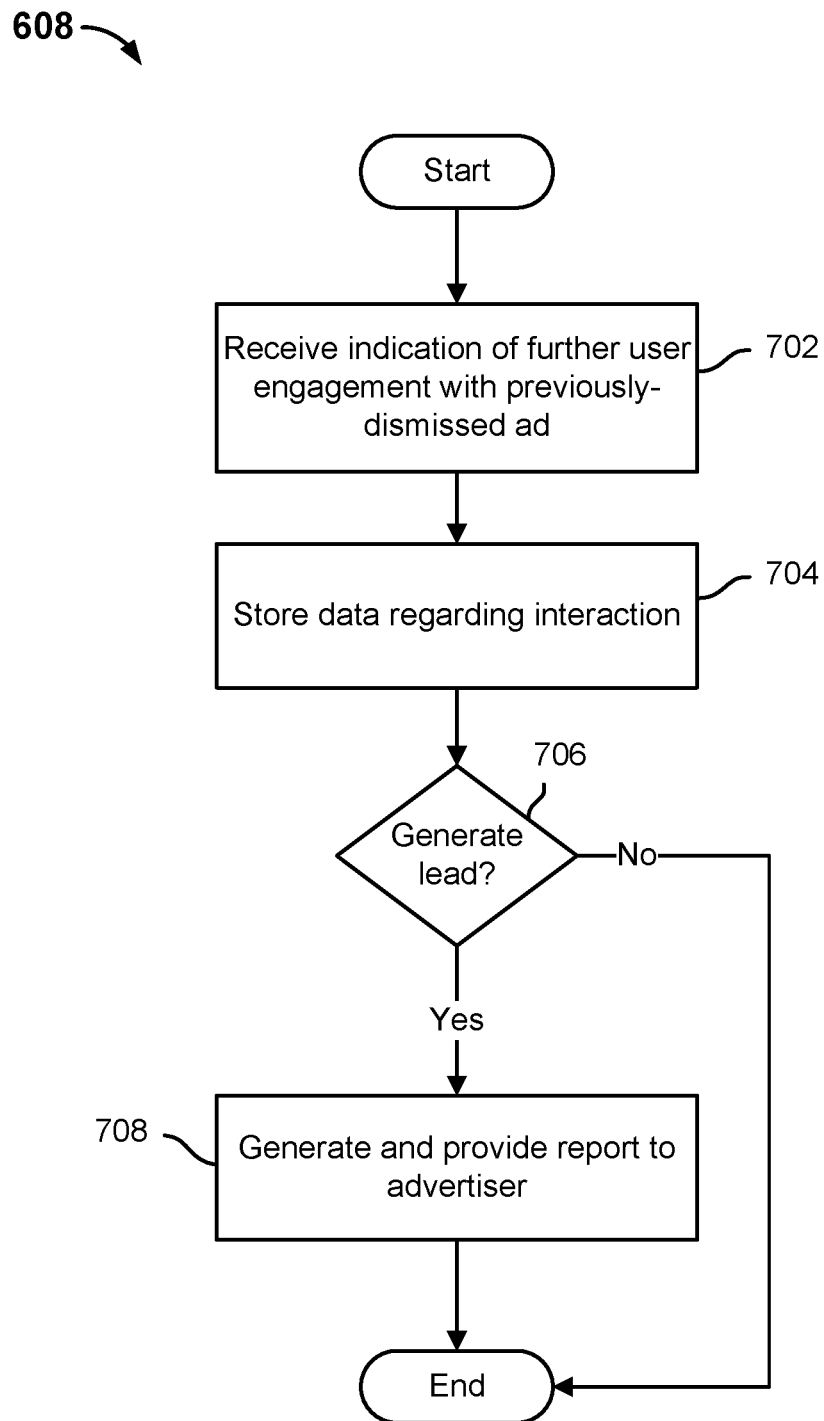
FIG. 7 is a flow chart illustrating an embodiment of a process to track and respond to user engagement with content dismissed previously for follow up later.

FIG. 7 is a flow chart illustrating an embodiment of a process to track and respond to user engagement with content dismissed previously for follow up later. In some embodiments, the process of FIG. 7 may be used to implement step 608 of FIG. 6. In the example shown, an indication is received of further user engagement with a previously-dismissed ad and/or associated follow up content (702). For example, the user may be observed to select the ad from a queue of previously-dismissed ads, or open a link in an email or other communication sent by way of follow up. Data regarding the observed interaction is stored (704). If criteria to generate and send a sale "lead" or other report to the advertiser is satisfied (706), a report is generated and sent to the advertiser (708). Subsequent further interactions associated with the same content may be tracked in subsequent iterations of the process of FIG. 7. Tracking information may be accumulated in this way until a "lead" or other report generation criteria is met (706). Examples of such criteria include, without limitation, the user selecting an option to be contacted by a sales rep, the user accessing content from other sources about the product or service, the user placing a related item in a shopping cart but not consummating a transaction, etc.

In various embodiments, use of techniques disclosed herein may enable one or more of the following benefits to be realized:

1) Users (especially mobile or streaming media users) may be more willing to respond to a relevant ad if they know it will not interrupt their workflow or current task and can do so without providing personal contact data directly to an advertiser (especially if doing so could dismiss the current ad in exchange).
2) Advertisers may receive more responses from qualified leads.
3) Advertisers may be able to deliver extremely valuable "leave behind" materials that are more likely to result in a valuable response than a single ad impression.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory device; and
a processor coupled to the memory device and configured to:
receive from a user device via a network an indication to display previously dismissed content, wherein the previously dismissed content includes content that was previously presented on the user device and the user device is configured to receive, from a user via an interface of the user device, an input that indicates the user desires to dismiss and follow up with the content at a later time, wherein interface of the user device is configured to receive one or more different types of input from the user to dismiss the content, wherein an input type of the different types of input that dismisses the content has a corresponding electronic follow-up format;
retrieve from a data store a list of the previously dismissed content from the memory device;
provide via the network the list of the previously dismissed content to the user device in an electronic follow-up format associated with the user corresponding to the input type received from the user to dismiss the content, wherein the previously dismissed content includes follow up content, wherein the follow up content includes content other than or in addition to the previously dismissed content;
track user engagement with the list of the previously dismissed content on the user device; and
perform a responsive action based at least in part on the tracked user engagement.

2. The system of claim 1, wherein user engagement includes at least one of deleting previously dismissed content from the list of the previously dismissed content without viewing further information, viewing the previously dismissed content for period of time, selecting a content of the previously dismissed content, interacting with the previously dismissed content, and clicking through to a website of a content provider associated with the previously dismissed content.

3. The system of claim 1, wherein the processor is further configured to store data associated with the tracked user engagement.

4. The system of claim 1, wherein to perform a responsive action, the processor is further configured to:
generate a sales record; and
send the sales record to a content provider.

5. The system of claim 1, wherein to perform a responsive action, the processor is further configured to provide a control to be displayed on the user device that when selected, enables a contact provider to contact the user.

6. The system of claim 1, wherein to perform a responsive action, the processor is further configured to send contact information associated with the user device to a content provider.

7. The system of claim 1, wherein the processor is further configured to:
receive an indication of the user engagement with a content of the previously dismissed content; and
store data associated with the user engagement.

8. The system of claim 7, wherein the processor is further configured to:
accumulate the data associated with the user engagement until report generation criteria is met; and
send the accumulated data to a content provider in the event the report generation criteria is met.

9. The system of claim 8, wherein the report generation criteria includes receiving a selection of an option to be contacted by the content provider.

10. The system of claim 8, wherein the report generation criteria includes a user associated with the user device accessing other content associated with the content provider.

11. The system of claim 8, wherein the report generation criteria includes a user associated with the user device beginning but not completing a transaction with the content provider.

12. The system of claim 1, wherein the previously dismissed content was previously displayed on the user device and dismissed by a user input.

13. The system of claim 12, wherein the user input comprises a dismiss and follow up gesture entered via a touchscreen.

14. A method of providing access to previously dismissed content, comprising:
receiving from a user device via a network an indication to display the previously dismissed content, wherein the previously dismissed content includes content that was previously presented on the user device and the user device is configured to receive, from a user via an interface of the user device, an input that indicates the user desires to dismiss and follow up with the content at a later time, wherein interface of the user device is configured to receive one or more different types of input from the user to dismiss the content, wherein an input type of the different types of input that dismisses the content has a corresponding electronic follow-up format;
retrieving from a data store a list of the previously dismissed content from a memory device;
providing via the network the list of the previously dismissed content to the user device in an electronic follow-up format associated with the user corresponding to the input type received from the user to dismiss the content, wherein the previously dismissed content includes follow up content, wherein the follow up content includes content other than or in addition to the previously dismissed content
tracking user engagement with the list of the previously dismissed content on the user device; and
performing a responsive action based at least in part on the tracked user engagement.

15. The method of claim 14, wherein user engagement includes at least one of deleting previously dismissed content from the list of the previously dismissed content without viewing further information, viewing the previously dismissed content for period of time, selecting a content of the previously dismissed content, interacting with the previously dismissed content, and clicking through to a website of a content provider associated with the previously dismissed content.

16. The method of claim 14, further comprising storing data associated with the tracked user engagement.

17. The method of claim 14, further comprising providing a control to be displayed on the user device that when selected, enables a contact provider to contact the user.

18. A computer program product embodied in a non-transitory computer readable storage medium and comprising computer instructions for:

receiving from a user device via a network an indication to display previously dismissed content, wherein the previously dismissed content includes content that was previously presented on the user device and the user device is configured to receive, from a user via an interface of the user device, an input that indicates the user desires to dismiss and follow up with the content at a later time, wherein interface of the user device is configured to receive one or more different types of input from the user to dismiss the content, wherein an input type of the different types of input that dismisses the content has a corresponding electronic follow-up format;

retrieving from a data store a list of the previously dismissed content from a memory device;

providing via the network the list of the previously dismissed content to the user device in an electronic follow-up format associated with the user corresponding to the input type received from the user to dismiss the content, wherein the previously dismissed content includes follow up content, wherein the follow up content includes content other than or in addition to the previously dismissed content;

tracking user engagement with the list of the previously dismissed content on the user device; and performing a responsive action based at least in part on the tracked user engagement.

19. The system of claim 1, wherein the previously dismissed content is provided to the user device according to one or more user preferences, wherein the one or more user preferences include a timing of providing the list of the previously dismissed content.

* * * * *